(12) United States Patent
Rauland

(10) Patent No.: US 9,399,880 B2
(45) Date of Patent: Jul. 26, 2016

(54) ATTACHMENT UNIT FOR A HEAT EXCHANGER OF A MOTOR VEHICLE

(71) Applicant: MAHLE International GmbH, Stuttgart (DE)

(72) Inventor: Werner Rauland, Pforzheim (DE)

(73) Assignee: MAHLE International GmbH, Stuttgart (DE)

( * ) Notice: Subject to any disclaimer, the term of this patent is extended or adjusted under 35 U.S.C. 154(b) by 0 days.

(21) Appl. No.: 14/484,663

(22) Filed: Sep. 12, 2014

(65) Prior Publication Data

US 2015/0076302 A1    Mar. 19, 2015

(30) Foreign Application Priority Data

Sep. 18, 2013  (DE) .......................... 10 2013 218 750

(51) Int. Cl.

| | |
|---|---|
| A47B 96/06 | (2006.01) |
| A47G 29/00 | (2006.01) |
| A47K 1/00 | (2006.01) |
| E05D 7/00 | (2006.01) |
| B60K 5/00 | (2006.01) |
| E05D 3/02 | (2006.01) |
| F16M 13/02 | (2006.01) |
| B60K 11/04 | (2006.01) |
| E05D 7/10 | (2006.01) |

(52) U.S. Cl.
CPC ... *E05D 7/00* (2013.01); *B60K 5/00* (2013.01); *B60K 11/04* (2013.01); *E05D 3/02* (2013.01); *E05D 7/1066* (2013.01); *F16M 13/02* (2013.01); *E05Y 2900/538* (2013.01)

(58) Field of Classification Search
CPC .............. E05D 7/00; E05D 3/02; B60K 5/00; F16M 13/02
See application file for complete search history.

(56) References Cited

U.S. PATENT DOCUMENTS

| | | | | |
|---|---|---|---|---|
| 4,281,733 A * | 8/1981 | Miller | .................... | B62D 25/12 180/69.21 |
| 4,366,598 A * | 1/1983 | Harasaki | ................ | B62D 25/12 16/382 |
| 2006/0005943 A1* | 1/2006 | Rasset | ................... | F28D 1/0435 165/77 |

FOREIGN PATENT DOCUMENTS

| | | |
|---|---|---|
| DE | 39 01 193 C1 | 2/1990 |
| DE | 43 10 144 C1 | 6/1994 |
| DE | 43 35 813 C1 | 11/1994 |
| DE | 102 10 345 A1 | 9/2003 |
| DE | 10 2005 044 293 A1 | 4/2007 |
| EP | 0 379 179 A2 | 7/1990 |

* cited by examiner

*Primary Examiner* — Amy Sterling
(74) *Attorney, Agent, or Firm* — Muncy, Geissler, Olds & Lowe, P.C.

(57) ABSTRACT

An attachment unit for a heat exchanger of a motor vehicle, having an integral hinge, which has two attachment parts disposed movable relative to one another, whereby the first attachment part is used for positioning on the heat exchanger and the second attachment part for fixation to a motor vehicle body. The attachment part is produced in a simple manner and is stable against vibrations by the motor vehicle. The integral hinge for support after installation on the heat exchanger has at least one retaining element for the form-fitting insertion in a bearing of the integral hinge.

12 Claims, 4 Drawing Sheets

ATTACHMENT UNIT FOR A HEAT EXCHANGER OF A MOTOR VEHICLE

This nonprovisional application claims priority under 35 U.S.C. §119(a) to German Patent Application No. DE 10 2013 218 750.5, which was filed in Germany on Sep. 18, 2013, and which is herein incorporated by reference.

BACKGROUND OF THE INVENTION

1. Field of the Invention

The present invention relates to an attachment unit for a heat exchanger of a motor vehicle.

2. Description of the Background Art

EP 0 379 179 discloses a heat exchanger attachment for internal combustion engines, which has an integral hinge that connects two movably mounted fastening parts. The vehicle body-side support faces are arranged at the first fastening part of the integral hinge, whereas the locking of the fastening part and the heat exchanger-side attachment occurs with the second fastening part of the integral hinge.

It has become apparent during use of integral hinges in motor vehicle that they are not stable enough to the shaking and vibrations of the motor vehicle, so that the integral hinge can tear and as a result no longer hold the heat exchanger.

In order to prevent this in the conventional art, a plurality of external parts 13, 14, 15, 16, 17, 18 are often needed to fix the heat exchanger attachment sufficiently to the heat exchanger, as is evident from FIG. 4. These additional external parts increase not only the installation effort but also the logistics cost during the installation of the heat exchanger in the motor vehicle. Moreover, additional work steps are necessary; i.e., detaching the mounting bracket by arranging the bearing support in a bearing with a lug on the housing and an additional screw connection is necessary.

SUMMARY OF THE INVENTION

It is therefore an object of the present invention to provide an attachment unit for a motor vehicle heat exchanger, the unit, which despite a low installation effort, enables a stable mounting of the heat exchanger without damage to the integral hinge.

An exemplary embodiment relates to an integral hinge, which for support after installation on the heat exchanger has at least one retaining element for form-fitting insertion in a bearing of the integral hinge. A vibration-proof attachment unit, which reliably prevents damage to the integral hinge, is enabled by means of such a retaining element.

Advantageously, one retaining element each can be formed on both sides on the first attachment part, which engages form-fittingly with the bearing of the integral hinge when the first attachment part is folded down. With this design, only one process step is necessary to increase the vibration resistance of the attachment unit on the heat exchanger, which reduces the installation effort and the manufacturing costs.

In an embodiment, the cylinder segment-like retaining element comprises the cylinder-like bearing of the integral hinge, whereby a radius of the retaining element extends around a midpoint of an integral hinge joint at which the axially extending cylinder-like support is positioned. This embodiment of the retaining element and of the bearing of the integral hinge comprises not only the form-fitting interlocking of the two elements, but also guarantees that the cylinder segment-like retaining element is attached simultaneously to the cylinder-like bearing of the integral hinge with the movement of the first attachment part.

In an embodiment, an inner radius of the cylinder segment-like retaining element corresponds approximately to the outer radius of the cylinder-like integral hinge bearing. As a result, a gliding movement of the retaining element on the bearing of the integral hinge is possible, whereby the inner or outer radius is used simultaneously as a guide during the movement of the first attachment part.

The inner or outer radius in this case serves as a guide in a plane spanned in two spatial directions. This plane coincides with the spatial extension of the attachment part in the folded state. The two spatial directions forming the plane are preferably the spatial directions X and Y which are perpendicular to one another, whereby the third spatial direction Z is at a right angle to the spanned plane.

In an embodiment, the first attachment part, lying on the heat exchanger, is attached force-fittingly to a connection unit receiving the heat exchanger. Thus, it is prevented assuredly that during movement of the motor vehicle the first attachment part comes loose from the heat exchanger and the latter is loosened in its anchoring.

Advantageously, the force-fitting connection of the first attachment part to the connection unit occurs via a screw or clip connection. The use of a plastic clip in particular enables the installation of the first attachment part on the connection unit without additional external parts, as a result of which a stable retention of the attachment unit is guaranteed.

Advantageously, the second attachment part can be attached undetachably to the motor vehicle body. This has the advantage that it cannot follow the movement of the first attachment part and thus a reliable securing of the heat exchanger in the connection unit is enabled.

In an embodiment, the second attachment part can be connected to the body by material bonding, preferably by plastic extrusion. Such a plastic extrusion is simple to realize and lowers production costs.

In an embodiment, the at least one retaining element can be molded onto the first attachment part. In so doing, the retaining element can be produced simultaneously with the production of the integral hinge, which is why no other additional parts are necessary for realizing the retaining element.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
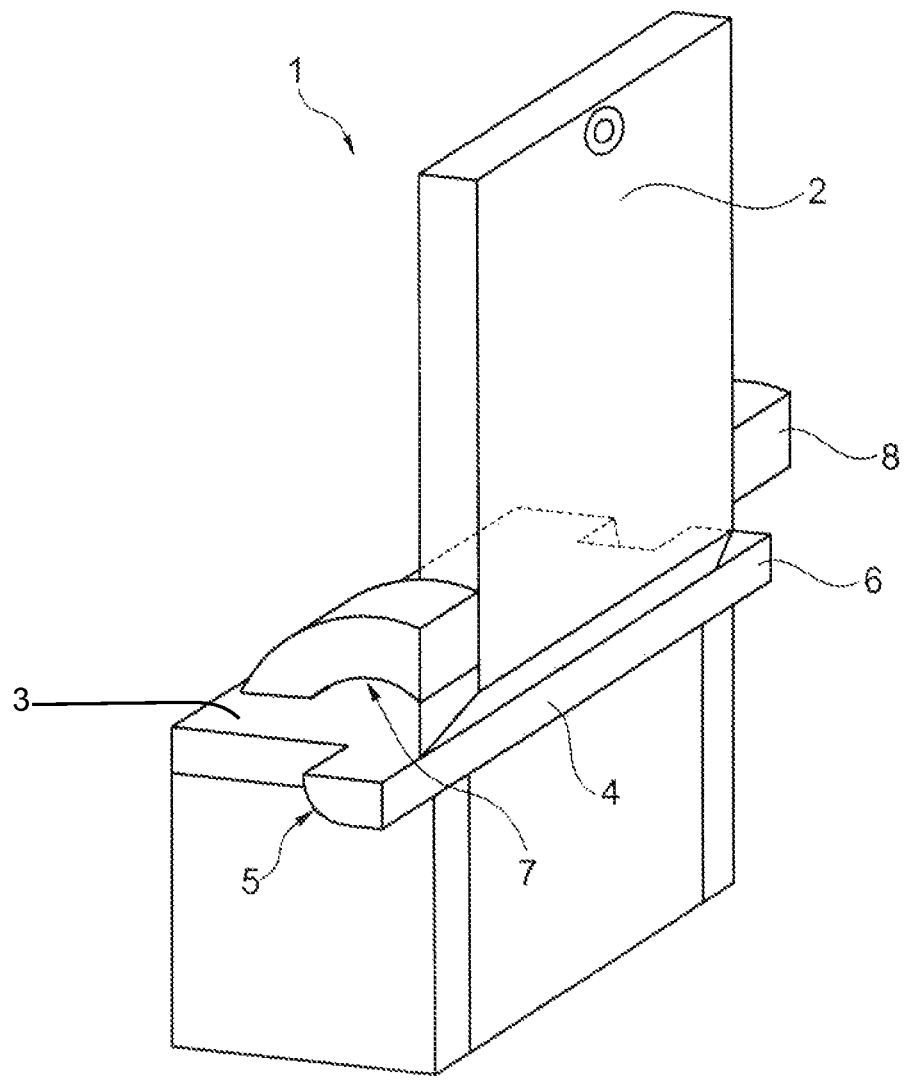
FIG. 1 shows an exemplary embodiment of an attachment unit of the invention.

FIG. 1 shows an exemplary embodiment of the attachment unit of the invention. The attachment unit is formed here as integral hinge 1. Integral hinge 1 has a first attachment part 2 and a second attachment part 3, which are movably connected to one another via an integral hinge joint 4. Integral hinge joint 4 on both sides comprises cylinder-like pins, which project beyond the first and second attachment parts 2, 3 of integral hinge 1 and are formed as bearing 5, 6. One retaining element 7, 8 each is attached on both sides to first attachment part 2, which is made approximately rectangular (FIG. 1). Said retaining elements 7, 8 each have the shape of a cylinder segment and have an inner diameter which is approximately equal to the outer diameter of bearing 5, 6. It is typical for the inner or outer diameter of retaining elements 7, 8 or bearing 5, 6 that their midpoint extends through the longitudinal axis of integral hinge joint 4.

Figure 2:
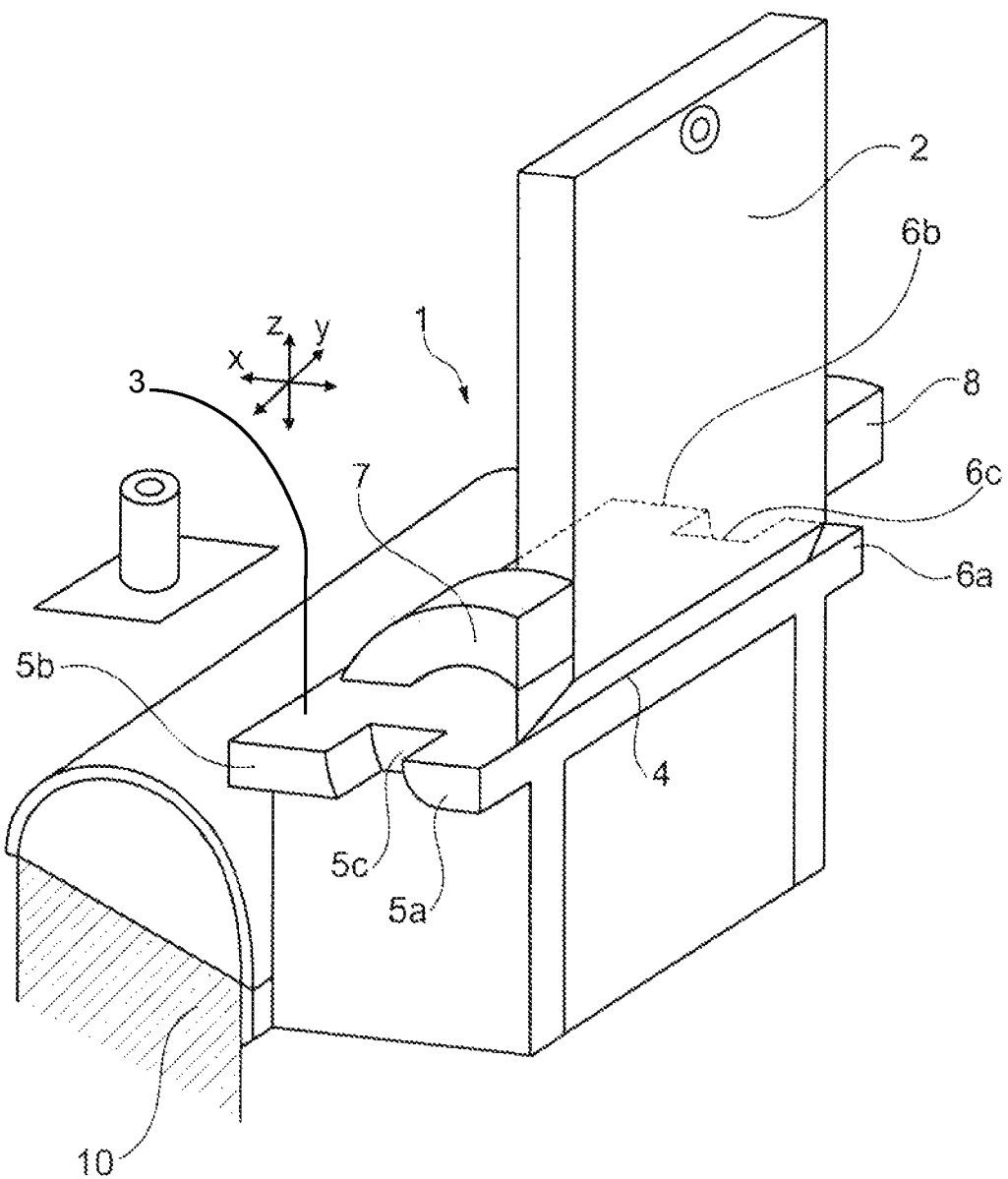
FIG. 2 shows an exemplary embodiment of an attachment unit of the invention.

FIG. 2 shows an alternative embodiment of attachment part 2. Retaining elements 7, 8 are configured according to FIG. 1. Bearings 5, 6 in FIG. 2 are made of multiple parts and have bearing parts 5a and 5b or 6a and 6b, which in each case are separated from one another by a cutout 5c or 6c.

When pivoting of attachment part 2 around the axis of integral hinge joint 4, retaining elements 7 or 8 each engage in cutouts 5c or 6c and are thus guided by bearing parts 5a and 5b or 6a and 6b along a spatial direction X and guided by bearing parts 5c or 6c in a spatial direction Y. Bearing parts 5a or 6a in this case reproduce the inner radius of retaining elements 7 or 8 and bearing parts 5b or 6b reproduce the outer radius of retaining elements 7 or 8. A form fit can be created by pivoting of attachment part 2 between bearing parts 5a, 5b, 5c and retaining element 7 or bearing parts 6a, 6b, 6c and retaining element 8.

FIG. 2 shows further a recess at the upper end region of attachment element 2, which comes to lie on a cylinder-shaped element in a state in which attachment element 2 is pivoted around the rotation axis of integral hinge joint 4. Attachment element 2 can be fixed via the recess by a screw or a clip in a bored hole in the cylinder-shaped element.

A heat exchanger 10, which can be fixed by the pivoting of attachment element 2 around the rotation axis of integral hinge joint 4, is disposed between the cylinder-shaped element and integral hinge 1.

Figure 3:
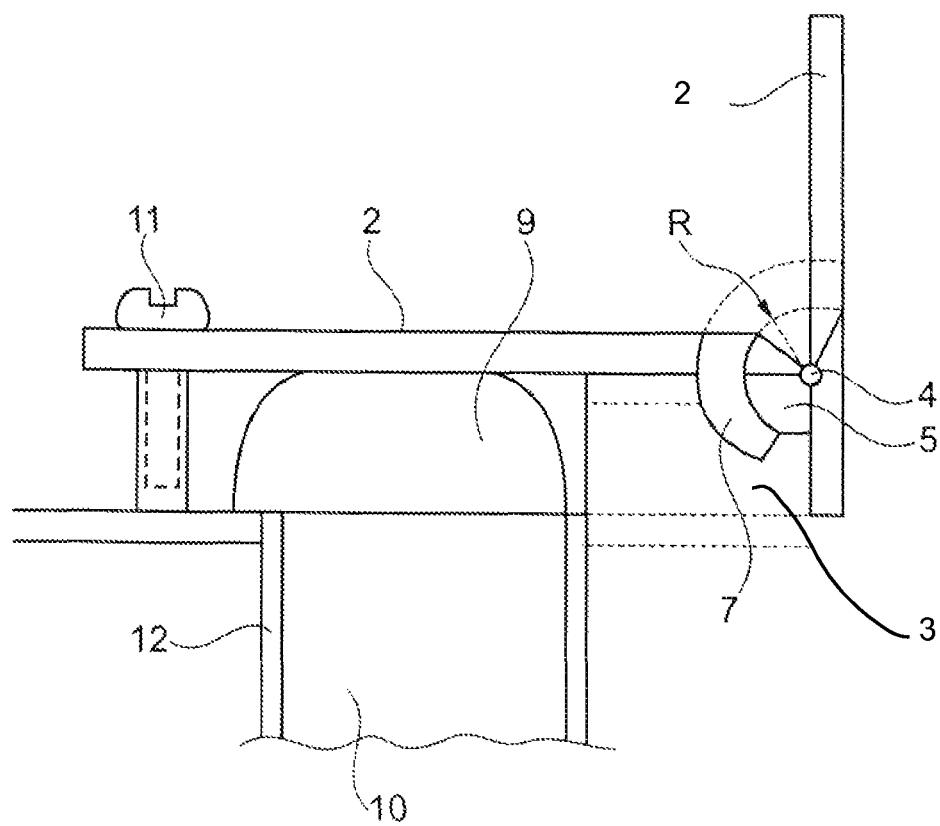
FIG. 3 shows an exemplary embodiment of the attachment unit of the invention in the folded down state.
Figure 4:
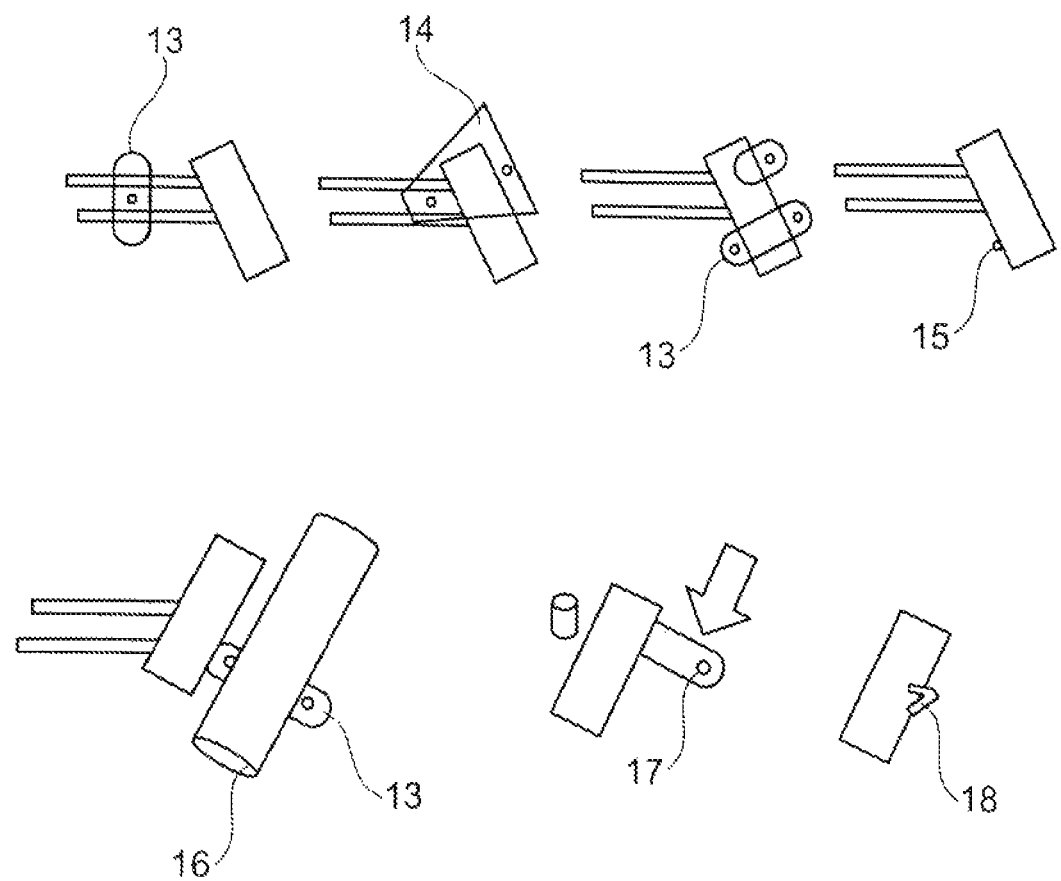
FIG. 4 shows an attachment unit according to the conventional art.

If second attachment part 3 is fixedly disposed on a motor vehicle body, first attachment part 2 is pivoted by 90° along the axis of integral hinge joint 4 and lies on a header 9 of heat exchanger 10. In this case, each retaining element 7, 8 surrounds bearing 5, 6, formed as a cylinder-like pin, as is evident from FIG. 3. To reliably prevent movement of first attachment part 2 during the driving of the motor vehicle, first attachment part 2 is fixed via a screw element 11 to a connection unit 12 supporting heat exchanger 10. Thus, integral hinge 1 is provided with a stable support, without it being able to be damaged by the movement of the motor vehicle.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An attachment unit for a heat exchanger of a motor vehicle, the attachment unit comprising:
   an integral hinge that has a first attachment part and a second attachment part disposed movable relative to one another along a hinge joint, the first attachment part being used for positioning on the heat exchanger and the second attachment part for fixation to a motor vehicle body; and
   the first attachment part having at least one retaining element for form-fitting insertion in at least one bearing of the second attachment part for support of the integral hinge after installation on the heat exchanger,
   wherein in an open position of the integral hinge, the at least one retaining element of the first attachment part is spaced apart from the at least one bearing of the second attachment part and in a closed position of the integral hinge, the at least one retaining element of the first attachment part is positioned inside of the at least one bearing of the second attachment part.

2. The attachment unit according to claim 1, wherein one retaining element is formed on each side on the first attachment part and one bearing is provided on each side of the second attachment part, each retaining element engages form-fittingly with a respective bearing when the first attachment part is folded down along the hinge joint.

3. The attachment unit according to claim 1, wherein the retaining element is a cylinder segment and the bearing is a cylinder segment bearing, and wherein a radius of the retaining element extends around a midpoint of the integral hinge joint at which the axially extending cylinder segment bearing is positioned.

4. The attachment unit according to claim 1, wherein an inner radius of the retaining element corresponds approximately to an outer radius of the cylinder segment bearing of the integral hinge.

5. The attachment unit according to claim 1, wherein the first attachment part, arranged on the heat exchanger, is attached force-fittingly to a connection unit receiving the heat exchanger.

6. The attachment unit according to claim 5, wherein the force-fitting attachment of the first attachment part to the connection unit occurs via a screw or a clip connection.

7. The attachment unit according to claim 1, wherein the second attachment part is attached undetachably to the motor vehicle body.

8. The attachment unit according to claim 7, wherein the second attachment part is connected to the motor vehicle body by material bonding or plastic extrusion.

9. The attachment unit according to claim 1, wherein the at least one retaining element is molded onto the first attachment part.

10. The attachment unit according to claim 1, wherein the at least one retaining element is arc-shaped and the at least one bearing is an opening having a contour that corresponds to the arc-shaped at least one retaining element.

11. The attachment unit according to claim 1, wherein in the closed position of the integral hinge, the first attachment part contacts and covers a header of the heat exchanger.

12. An attachment unit for a heat exchanger of a motor vehicle, the attachment unit comprising:
   an integral hinge that has a first attachment part and a second attachment part disposed movable relative to one another along a hinge joint, the first attachment part being used for positioning on the heat exchanger and the second attachment part for fixation to a motor vehicle body; and
   the first attachment part having at least one retaining element for form-fitting insertion in at least one bearing of the second attachment part for support of the integral hinge after installation on the heat exchanger,
   wherein in an open position of the integral hinge, the at least one retaining element of the first attachment part is spaced apart from the at least one bearing of the second attachment part and in a closed position of the integral hinge, the at least one retaining element of the first attachment part contacts the at least one bearing of the second attachment part.

* * * * *